UNITED STATES PATENT OFFICE.

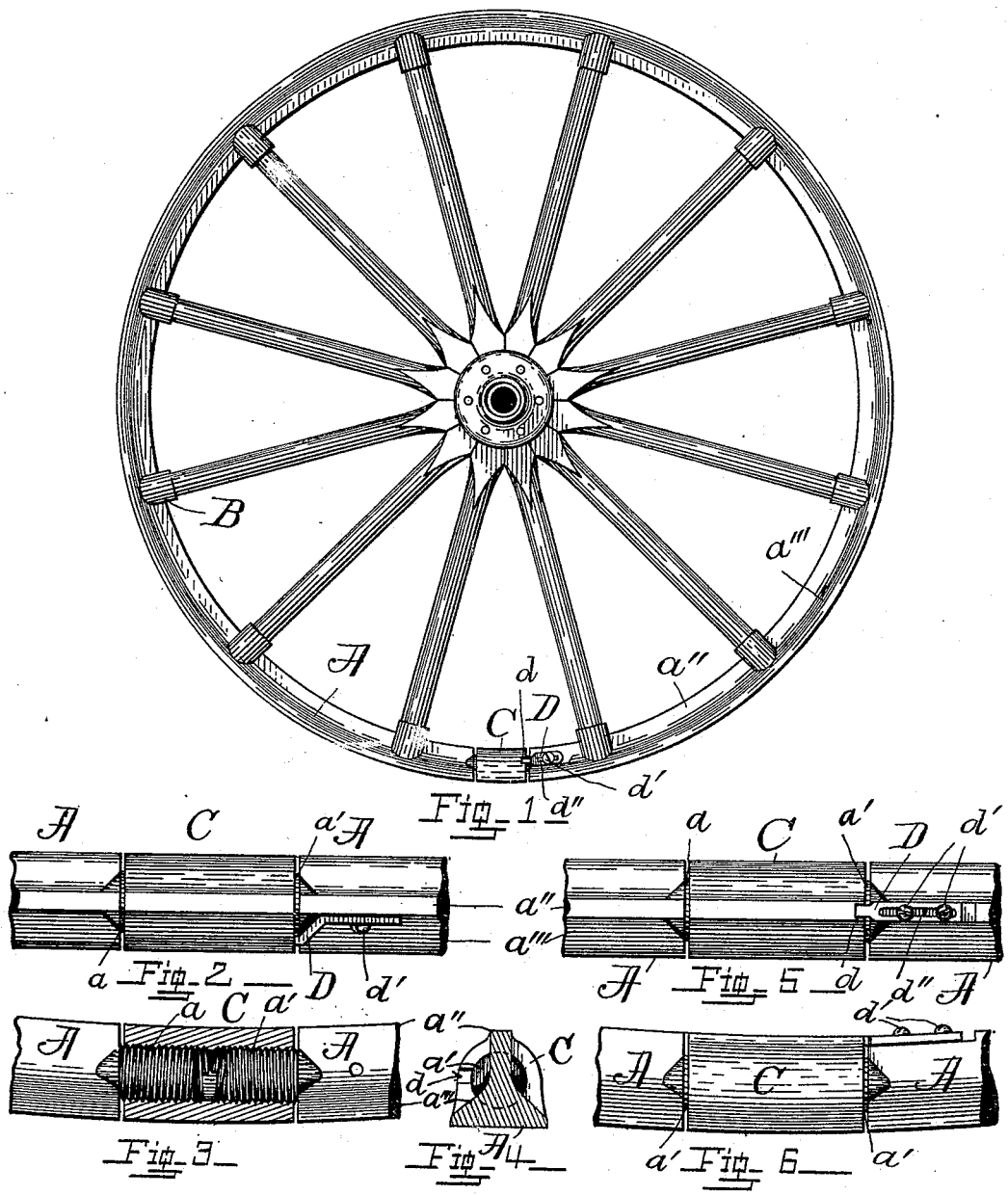

WILLIAM C. HODNETT, OF DOUGLASVILLE, GEORGIA.

VEHICLE-WHEEL.

SPECIFICATION forming part of Letters Patent No. 407,779, dated July 30, 1889.

Application filed November 9, 1888. Serial No. 290,405. (No model.)

*To all whom it may concern:*

Be it known that I, WILLIAM CRITTENDEN HODNETT, a citizen of the United States, residing at Douglasville, in the county of Douglas and State of Georgia, have invented certain new and useful Improvements in Vehicle-Wheels; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to that class of vehicle-wheels that have integral metal rims, the object being to provide an adjustment for tightening said rim and for holding it securely in that position.

The object is also to prevent the throwing up of sand or mud. It consists of a novel form on the inner side of the rim and of right and left hand screws on any two contiguous ends of the rim, and a sleeve having corresponding right and left hand internal screw-threads and a locking device for said sleeve, the details of all of which will be hereinafter fully described.

In the accompanying drawings, Figure 1 is a view of a wheel, showing most of the details in side elevation. Fig. 2 is a view of the inner side of a portion of the rim, showing also the sleeve and the locking device. Fig. 3 shows the connecting device with the locking-sleeve in section. Fig. 4 shows the contour of a cross-section through the rim, and also shows the sleeve by which the adjustment is made. Figs. 5 and 6 show a modification of the adjusting-sleeve and the locking device.

In these figures like reference-marks indicate corresponding parts in the several views.

A is the rim, and B are spoke-sockets. The hub and spokes may be of any approved construction. The rim has in cross-section a triangular form, with an inwardly-projecting flange $a''$, as shown in Fig. 4, thus forming on its lateral projections beveled inner faces $a'''$, that will prevent the flange from lifting the sand or mud, and hence of course obviate the throwing into the vehicle of sand or mud, the inwardly-projecting flange adding stiffness and strength. Any two contiguous ends of this rim are provided with projecting round ends $a$ and $a'$, on one end of which is a right-hand screw-thread and on the other of which is a left-hand screw-thread. These two ends are connected by a sleeve C, having corresponding internal right and left hand screw-threads and a tread that is uniform in width with the remainder of the rim of which it forms a part. The tightening of the rim is accomplished by turning the sleeve C in the direction in which it will draw in the threaded ends $a$ and $a'$. The sleeve C is held in the position in which its tread will coincide with that of the balance of the rim by means of the sliding catch D, that enters the notch $d$ in the sleeve, and is, passing through the slot $d''$, held by the screw $d'$ against the inwardly-projecting flange of the rim, as shown in Figs. 2 and 3, or by two screws $d'$, passing through the slot $d''$ and into the inner edge of the said flange, as shown in Figs. 5 and 6.

It is preferable in constructing wheels of this description to have the rims of such a length as will leave slight spaces, as shown, by reason of which the tire may be afterward tightened, as required. After the clearance thus left shall have been used in retightening the tire further tightening may be accomplished by shortening the sleeve C on either or both ends. It is obvious that more than one of these sleeves may be used; but it is preferable to use but one, as the wheel would be much stiffer than if more than one were used, and as one would be generally sufficient for all requirements.

Having thus described my invention, what I claim as new, and desire to secure by Letters Patent of the United States, is—

1. In a vehicle-wheel, the rim A, its contiguous ends formed with screw-threaded projections $a$ and $a'$, in combination with the internally-screw-threaded sleeve C, engaging the screw-threaded projections of the rim, substantially as shown and described.

2. In a vehicle-wheel of the class described, the rim A, the sleeve C, attached to contiguous ends of the rim by right and left hand screw-threads, the catch D, attached to the rim, and the notch $d$, arranged and operating substantially as and for the purpose specified.

In testimony whereof I hereunto affix my signature in presence of two witnesses.

W. C. HODNETT.

Witnesses:
A. P. WOOD,
B. F. RICHWOOD.